(12) United States Patent
Suojasto

(10) Patent No.: US 6,487,413 B1
(45) Date of Patent: Nov. 26, 2002

(54) METHOD OF ESTIMATING THE NEED OF CAPACITY FOR DIFFERENT PARTS OF A CELLULAR RADIO SYSTEM

(75) Inventor: Marko Suojasto, Pirkkala (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/423,725
(22) PCT Filed: May 13, 1998
(86) PCT No.: PCT/FI98/00411
§ 371 (c)(1),
(2), (4) Date: Jan. 18, 2000
(87) PCT Pub. No.: WO98/52378
PCT Pub. Date: Nov. 19, 1998

(30) Foreign Application Priority Data

May 14, 1997 (FI) .................................................. 972070

(51) Int. Cl.$^7$ ............................................... H04Q 7/20
(52) U.S. Cl. ...................... 455/446; 455/67.1; 455/453; 455/425
(58) Field of Search ................................ 455/446, 67.1, 455/453, 425, 435, 424, 422, 12.1, 428

(56) References Cited

U.S. PATENT DOCUMENTS

| | | | |
|---|---|---|---|
| 5,223,844 A | * 6/1993 | Mansell et al. | 340/825.49 |
| 5,305,466 A | 4/1994 | Taketsugu | |
| 5,329,576 A | * 7/1994 | Handforth | 379/55.1 |
| 5,548,816 A | 8/1996 | DeVaney | |
| 5,590,398 A | * 12/1996 | Matthews | 455/426 |
| 6,201,967 B1 | * 3/2001 | Goerke | 455/12.1 |
| 6,308,071 B1 | * 10/2001 | Kalev | 455/425 |

FOREIGN PATENT DOCUMENTS

| | | |
|---|---|---|
| EP | 0 710 043 A1 | 5/1996 |
| GB | 2 287 614 A | 9/1995 |
| WO | 94/11997 | 5/1994 |
| WO | 94/13114 | 6/1994 |
| WO | 96/35305 | 11/1996 |
| WO | 96/38013 | 11/1996 |
| WO | 98/28937 | 7/1998 |
| WO | 98/52378 A2 | 11/1998 |
| WO | 98/52378 A3 | 11/1998 |

* cited by examiner

Primary Examiner—Daniel Hunter
Assistant Examiner—Pablo N Tran
(74) Attorney, Agent, or Firm—Pillsbury Winthrop LLP

(57) ABSTRACT

This invention relates to a cellular radio system including a mobile telephone exchange, base stations and mobile stations, the geographical area covered by the cellular radio system being divided into location areas and the mobile stations being arranged to send location update messages to the base stations. In order that the number of mobile stations located in the area may be ascertained more accurately than before, the system includes storing means for monitoring location update messages and for storing data contained in the location update messages in a memory means, and means for transmitting the data stored in the memory means further to the operator of the system, for an estimation of the need of capacity for the different parts of the system on the basis of the stored data.

7 Claims, 2 Drawing Sheets

| BASE STATION | PRECEDING LOCATION AREA | | |
|---|---|---|---|
| | LA1 | LA2 | LA3 |
| BTS4 | 10 | 5 | 8 |
| BTS5 | 15 | 12 | 3 |

METHOD OF ESTIMATING THE NEED OF CAPACITY FOR DIFFERENT PARTS OF A CELLULAR RADIO SYSTEM

BACKGROUND OF THE INVENTION

1. Field of the Invention

This invention relates to a method of estimating the need of capacity for different parts of a cellular radio system divided into location areas, mobile stations being arranged to send location update messages to the other parts of the system in predetermined situations. The invention relates further to a cellular radio system comprising a mobile telephone exchange, base stations and mobile stations, the geographical area covered by the cellular radio system being divided into location areas and the mobile stations being arranged to send location update messages by radio to the base stations in predetermined situations.

This invention relates to determining so-called Hot-Spot locations in a cellular radio system, which means finding possible bottlenecks as to the required traffic capacity. A problem associated with planning cellular radio systems consists in estimating the traffic capacity needed. Cellular radio systems are generally dimensioned by assuming that all mobile stations belonging to the system do not communicate simultaneously, but the aim of the dimensioning is to find the maximum conceivable number of telephones which are assumed to communicate in practice at a predetermined moment, after which the system is dimensioned in such a way that it is capable of coping with this load. In order that the dimensioning of the system at least to some extent may be based on reality (and not only on guesswork) within a predetermined geographical area, it is necessary to find out the number of mobile stations simultaneously located within said area.

2. Description of Related Art

Solutions for finding out the number of mobile stations located in a predetermined area are previously known, whereby the number of mobile stations is found out on the basis of measurement reports of active mobile stations (call going on). This means that, in a GSM (Global System for Mobile communications) system, for instance, active mobile stations measure continuously, while being on a traffic channel, besides the signal strengths of their own base stations, also signals from six strongest neighbouring base stations and transmit reports on measurement results continuously to the other parts of the system. However, the most significant drawback of this known solution is that it is based expressly on detecting active mobile stations. This means in practice that only those mobile stations through which a call is going on at said moment are taken into consideration. It is clear that this way of detection may give a rather distorted picture of the number of mobile stations actually located in the area, because passive phones located in the area, meaning those mobile stations through which no call is going on at said moment, are not considered in any way. However, the number of passive phones may be rather big, for which reason they should absolutely be taken into consideration when the system is dimensioned.

SUMMARY OF THE INVENTION

An object of this invention is to solve the above problem and to facilitate the dimensioning of the cellular radio system in such a way that the real number of phones located in a predetermined geographical area could be taken into consideration at the dimensioning better than before. This object is achieved by the method according to the invention, which is characterized in that for an estimation of the need of capacity in a predetermined geographical area: a new location area covering said area is defined for the system; said new location area is defined to be the location area of the base stations located in said area, at least during the time of estimating the need of capacity; location update messages transmitted from the new location area are monitored; statistics are kept on the location update messages detected, those statistics including an information on at least the number of location update messages received from the area; and the need of capacity for the area is estimated on the basis of the data stored in said statistics.

The invention is based on the idea that the number of mobile stations located in a predetermined area can be estimated more accurately than before by compiling statistics on location update requests/messages transmitted from the mobile stations to the other parts of the system, said requests being transmitted by the mobile stations in a manner known per se to the other parts of the system in predetermined situations anyway, for instance when they move from a location area to another or at predetermined intervals. When a new location area is initially created for the area to be monitored, the size (surface area) of which new area can be considerably smaller (for instance a single radio cell or a few of them) than the location areas used normally, the need of capacity can be ascertained accurately within the very area which is of interest. When statistics are kept on location update messages during a relatively long period, the number of phones in the area can be found out more accurately than before, because the number of passive mobile stations can be detected as well. The most significant advantage of the method of the invention is thus that it gives a more accurate picture of the number of phones located in the predetermined geographical area of interest, whereby potential bottlenecks concerning the capacity of the system can be found more easily than previously, and that the method of the invention can be applied by very small measures to existing systems by means of a software.

In a preferred embodiment of the method of the invention, a radio cell-specific information is maintained on from which location area mobile stations are coming when they send location update messages to a predetermined radio cell. This embodiment of the invention enables that statistics can be kept on the movements of the mobile stations. Accordingly, in the vicinity of harbours, airports and frontier crossing points, for instance, it is possible to keep statistics on where the mobile stations "turning up" come from.

In a second preferred embodiment of the method of the invention, a message is initially sent to the mobile stations belonging to the system, the message making the mobile stations shorten that cyclic time period during which they at least once send a location update message to the other parts of the system. By means of this preferred embodiment of the invention, it is possible to make sure in advance that a location update message is received during a relatively short monitoring period from as many mobile stations as possible.

In a third preferred embodiment of the method of the invention, an information on the number of those mobile stations located in the area from which a connection, such as a call, is going on at a predetermined moment is also entered into the statistics. This embodiment enables a more accurate estimation of the need of capacity than before, because an information on the number of both passive (no call going on) and active (a call going on) mobile stations can then be entered into the same statistics.

Another object of the invention is a cellular radio system to which the method of the invention can be applied. The cellular radio system of the invention is characterized in that the system comprises storing means arranged in a base station controller for monitoring location update messages received by base stations and for storing data contained in the location update messages in a memory means in response to detecting a location update message, and means for transmitting the data stored in the memory means further to an operator of the system for an estimation of the need of capacity for the different parts of the system on the basis of the data stored in the memory means.

According to the invention, it is preferable to monitor location update messages expressly in a base station controller, via which location update messages are transmitted anyway. Accordingly, applying the invention does not require any additional new components in the system, but the invention can also be applied to existing systems by reprogramming the base station controllers. This enables an estimation of the need of capacity without significant additional costs.

The preferred embodiments of the method and the cellular radio system of the invention appear from the attached dependent claims 2 to 4 and 5 to 7.

BRIEF DESCRIPTION OF THE DRAWINGS

In the following, the invention is described in more detail by way of example with reference to the attached figures, in which.

DETAILED DESCRIPTION OF THE INVENTION

Figure 1:
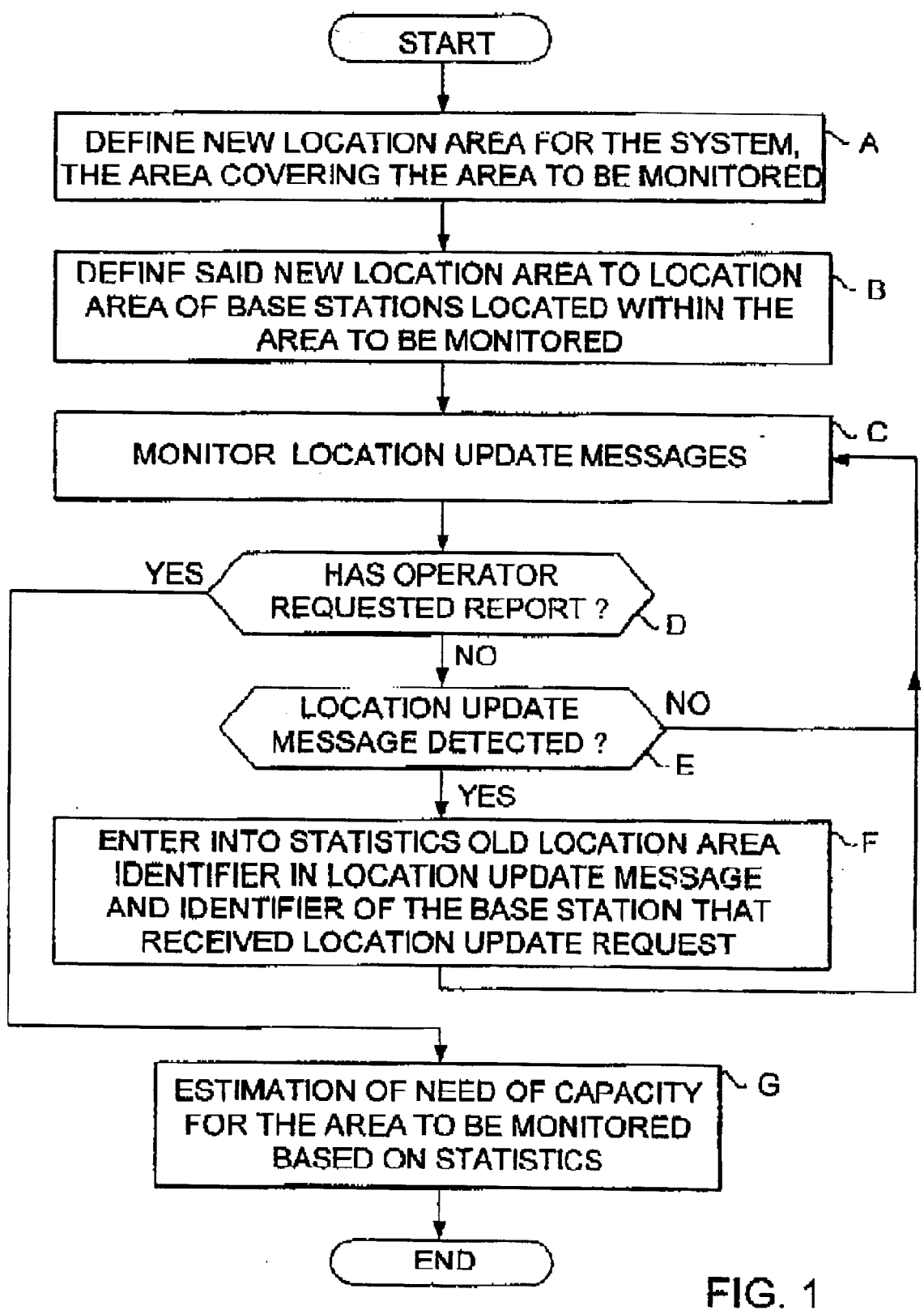
FIG. 1 shows a flow diagram of a first preferred embodiment of a method of the invention.

FIG. 1 shows a first preferred embodiment of the method according to the invention. The flow diagram of FIG. 1 can be applied for instance to ascertaining the need of capacity for a GSM cellular radio system in use in a predetermined area, i.e. to finding out how many mobile stations are located in the predetermined area and whether the system has sufficient capacity to serve said area efficiently. A monitoring period as per the flow diagram of FIG. 1 can preferably be carried out in the predetermined area twice a year, for instance, which gives a picture of how the number of mobile stations located in the area changes.

In block A, a new Location Area LA is defined for the system, which area covers the geographical area to be monitored. By this method step, the advantage is achieved that the location area to be monitored will be relatively small, which means that much information on the mobile stations moving in said area is received during a short time. In other words, the smaller the location areas of the system are, the more often the mobile stations moving within the coverage area of the system have to perform location updatings. If it is desirable to shorten the monitoring period during which location update messages are entered into statistics, it is possible to send the mobile stations belonging to the system a predetermined message, which makes the mobile stations shorten that cyclic time period during which they at least once send a location update message to the other parts of the system.

In block B, control messages are sent to those base stations which are located in a geographical area covered by the new location area, the messages making said base stations change their location area to the new location area.

In block C, a monitoring of location update messages is started. Said monitoring is implemented according to the invention preferably in a base station controller, via which the location update messages are transmitted from the base stations to a mobile telephone exchange anyway.

The monitoring continues until the operator requests a report on results in block D. In practice, this may take place for instance in such a way that the base station controller receives a message, which makes it interrupt the keeping of the statistics and send the collected data to the operator. Alternatively, the base station controller may maintain a timer from the beginning, whereby the base station controller sends a report to the operator, when the timer has gone off after a predetermined time period.

If a location update message from a mobile station has been detected in block E, block F is entered, where at least an information on the old location area contained in the location update message and an information on via which base station the location update message was received are stored in the statistics. The base station controller receives this information for instance directly by identifying the transmission channel of which base station the location update message was detected. Accordingly, the statistics receive a base station-specific information on from which location area mobile stations come to the radio cell maintained by said base station.

When the operator requests a report on results in block D (or when the timer has gone off), block G is entered, where the data collected in the statistics are sent to the operator, on the basis of which data it is possible to conclude the number of mobile stations located in the area to be monitored and the amount of the traffic capacity needed there.

Upon estimation of the needed traffic capacity, the new location area can be removed from the system and the base stations commanded there can be returned to their original location areas. Correspondingly, a new message can be sent to the mobile stations, which message makes the mobile stations reset those parameters to the initial value which define the length of that cyclic time period during which they at least once send a location update message to the other parts of the system.

Figures 2, 3:
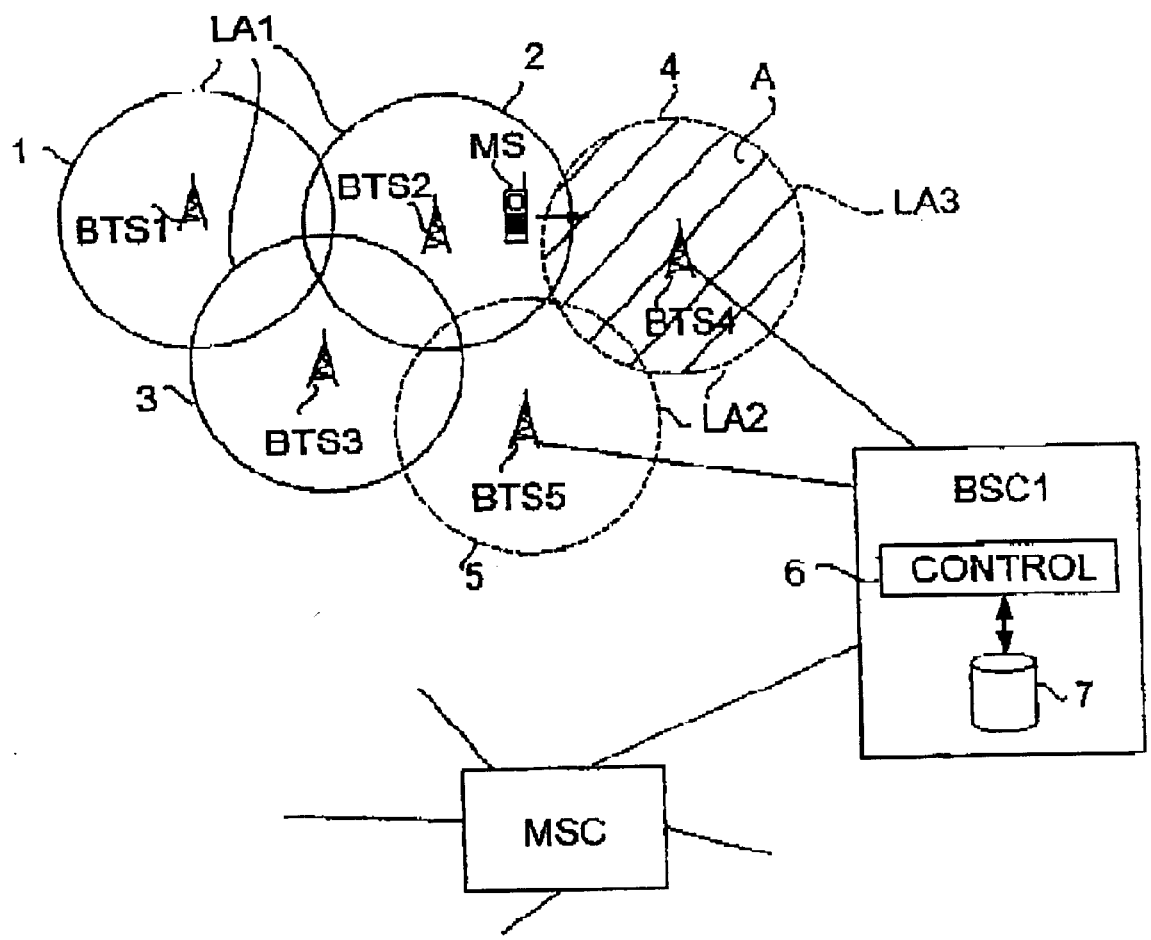
FIG. 2 shows a block diagram of a first preferred embodiment of a cellular radio system of the invention.
FIG. 3 illustrates statistics to be kept in a base station controller of FIG. 2.

FIG. 2 shows a block diagram of the first preferred embodiment of the cellular radio system according to the invention. The cellular radio system shown in FIG. 2 may be for instance part of a GSM system. A mobile station of the GSM system sends a location update message in a manner known per se to the other parts of the system when being in a passive state (IDLE mode), which means that no call is going on, when:

said mobile station moves to monitor a base station belonging to another location area. In practice, this generally means that the mobile station has moved from one place to another, whereby signals from the base station it was monitoring originally are received with a lower quality than signals from some other base station. If this other base station then belongs to another location area, the mobile station detects this from the signals sent by the base station, whereby the mobile station, while moving to monitor the new base station, informs of this to the other parts of the system by sending a location update message to the new base station.

the mobile station has been switched off and it is switched on. Then the mobile station monitors and measures the base station signals it receives, chooses the base station whose signals are strongest and sends a location update message to said base station.

a predetermined time has passed since the preceding location update message was sent (periodical update). From the Operations & Maintenance Centre of the system, the operator of the system may generally define for the mobile stations belonging to the system a time period during which each mobile station shall send a location updating. Depending on the situation, said time period may be for instance 10 to 60 min. Consequently, the mobile stations perform location updatings also when they remain in place.

FIG. 2 shows five radio cells 1 to 5 served by five base stations BTS1 to BTS5, respectively. The radio cells are divided into location areas in such a way that the radio cells 1 to 3 form a first location area LA1, and the radio cells 4 and 5 illustrated by broken lines form a second location area LA2. In a GSM system, the size of the location areas may be for instance 2 to 3 radio cells.

By increasing the number of cells belonging to the same location area, the number of location update messages occurring in the system, and simultaneously, the load of the system are reduced. On the other hand, if too many cells are combined in the same location area, a situation arises in which the area increases where the mobile station may be located (i.e. the accuracy weakens with which the location of the mobile station is known). Then the load of the network grows, because the number of those radio cells grows in which a call (paging) has to be sent to a predetermined mobile station in connection with a terminating call, for instance. Consequently, the size of the location area is practically a compromise between the above factors.

In case of FIG. 2, the base stations BTS4 and BTS5 are controlled by the same base station controller BSC1, the base station controller transmitting communication signals between the base stations BTS4 and BTS5 and the mobile telephone exchange MSC. The base stations BTS1 to BTS3 may be subject to the same base station controller BSC1 or some other base station controller.

If the operator of the system of FIG. 2 wishes to find out the number of mobile stations in the area A (shown as lined), i.e. the potential need of capacity, he may define the area as a separate location area LA3. From FIG. 2 is seen that the base station BTS4 is located in the area A. Then the location area of the base station BTS4 is changed in the system (both in the base station controller BSC1 and the mobile telephone exchange controlling it) in such a way that its location area will be LA3 (and not LA2, as before). After this, the location area LA2 comprises only the base station BTS5.

Subsequently, control means 6 of the base station controller BSC1 are arranged to control location update messages transmitted through it to the mobile telephone exchange MSC. In known cellular radio systems, location update messages are generally transmitted transparently through the base station controller to the mobile telephone exchange, i.e. the base station controller does not in any way process the data contained in the location update messages. Differing from that, the control unit 6 of the base station controller BSC1 detects according to the invention location update messages transmitted to the base station controller and stores data contained therein in a database 7. In addition to this, the base station controller also transmits the location update messages forward to the mobile telephone exchange to be further processed in a way similar to the known solutions.

In addition to the number of location update messages, the control unit 6 may be programmed to store in the database 7 also an information showing the number of those mobile stations located in the area A from which a connection, such as a call, is going on at a specific moment. When this information is stored in the database 7 at predetermined intervals, a very accurate information on the number of mobile stations located in the area A is received through the database 7, which means that both the passive (no call going on) and active (a call going on) mobile stations are taken into consideration.

As regards location update messages, the control unit 6 stores in the database 7 at least an information on which is the preceding location area of the mobile station that sent a location update message. This information is included in the location update message. Further, the identifier of that base station through which the location update message was received is also stored in the database 7. The base station controller receives this information from the fact that it knows in the communications channel of which base station the location update message was detected.

Depending on the system, the control unit 6 may be provided with timer means, whereby it sends the data stored in the database 7 after a predetermined time period further to a network management centre, from where the operator may utilize them, while the control unit 6 empties the content of the database and starts a new data collecting period. Alternatively, sending data to the operator and emptying the content of the database as described above may take place in response to a control message sent by the operator from the network management centre.

Differing from the embodiment of FIG. 2, location update messages may naturally be detected and entered into statistics in some other part of the network, for instance in the mobile telephone exchange. In a GSM system, for instance, location update messages may then be entered into statistics only location area-specificly, and not radio cell-specificly, as in the embodiment of FIG. 2.

FIG. 3 illustrates statistics to be kept in the base station controller of FIG. 2. Base station-specific statistics on location update messages are kept in the base station controller.

From the statistics of FIG. 3 is seen that 23 location update messages in total have been received through the base station BTS4 during a monitoring period (24 hours, for instance). 10 of these messages have been received from the mobile stations the former location area of which was LA1, which means that the mobile stations in question apparently have moved from cell 2 to cell 4 of FIG. 2. Correspondingly, the base station BTS4 has received five location update messages from the mobile stations the former location area of which was LA2, which means that these mobile stations apparently have moved from cell 5 to cell 4 of FIG. 2. Moreover, the base station BTS4 has received eight location update messages from the mobile stations the former location area of which was LA3, i.e. the same as the location area of the base station BTS4. Accordingly, the eight mobile stations in question have remained in place in cell 4, whereby the reason for sending location update messages has been the expiration of the time period described in connection with FIG. 2 (during which period the mobile stations shall send a location update message), or alternatively, the mobile stations have been switched off temporarily, whereby they have sent a location update message upon being switched on.

As regards the base station BTS5, the statistics of FIG. 3 show that the base station in question has received totally 30 location update messages, of which 15 come from the mobile stations arrived from cell 2 or 3 to cell 5 of FIG. 2, 12 from the mobile stations which have remained in place in cell 5, and three from the mobile stations arrived from cell 4 to cell 5.

It is to be understood that the above description and the figures relating to that are only intended to illustrate the present invention. Different variations and modifications of the invention will be obvious to persons skilled in the art without any deviations from the scope and spirit of the invention set forth in the attached claims.

What is claimed is:

1. A method of estimating the need of capacity for different parts of a cellular radio system divided into location areas, mobile stations being arranged to send location update messages to the other parts of the system in predetermined situations, comprising:

identifying a predetermined geographical area for which the operator wishes to estimate the need of capacity, defining a new location area covering said area, defining said new location area to be the location area of the base stations located in said area during the time of estimating the need of capacity, monitoring location update messages transmitted from the new location area, keeping statistics on the location update messages detected, these statistics including an information on at least the number of location update messages received from the area, estimating the need of capacity for the area on the basis of the data in said statistics, and removing said new location area from the system.

2. The method according to claim 1, wherein said statistics are kept in such a way that radio cell-specific information on which was the former location area of the mobile station that sent a location update message through said radio cell is entered into the statistics.

3. The method according to claim 1 or 2, wherein, for an estimation of the need of capacity for a predetermined geographical area, the method comprises as a preliminary phase a transmission of a message by radio to the mobile stations belonging to the system, whereby the mobile stations in response to said message shorten that cyclic time period during which they send at least once a location update message to the other parts of the system.

4. The method according to claim 1 or 2, wherein an information on the number of those mobile stations in which a traffic connection is going on at a predetermined moment is also stored in said statistics.

5. A cellular radio system, the geographical area covered by the cellular radio system being divided into location areas, said system comprising:

a mobile telephone exchange, base stations, mobile stations arranged to send location update messages by radio to base stations of the system in predetermined situations, a base station controller controlling the function of a plurality of said base stations, storing means arranged in said base station controller for monitoring location update messages received by the base stations and for storing data contained in the location update messages in a memory means in response to detecting a location update message, and means for transmitting the data stored in the memory means further to an operator of the system for an estimation of the need of capacity for the different parts of the system on the basis of the data stored in the memory means.

6. The cellular radio system according to claim 5, wherein the storing means are further arranged to store in the memory means an information showing the number of those mobile stations which have a traffic connection going on at a predetermined moment.

7. The cellular radio system according to claim 5 or 6, wherein said storing means store in the memory means at least an information on through which base station a location update message has been received and on the identifier of the preceding location area contained in the location update message.

* * * * *